MAGNETIC STORAGE SYSTEMS

Filed July 24, 1959 3 Sheets-Sheet 1

INVENTORS.
ROBERT T. ADAMS
BARRY M. MINDES
BY [signature]
ATTORNEY

INVENTORS.
ROBER T. ADAMS
BARRY M. MINDES
BY [signature]
ATTORNEY

INVENTORS.
ROBERT T. ADAMS
BARRY M. MINDES
BY [signature]
ATTORNEY

United States Patent Office 3,069,664
Patented Dec. 18, 1962

3,069,664

MAGNETIC STORAGE SYSTEMS

Robert T. Adams, Short Hills, N.J., and Barry M. Mindes, New York, N.Y., assignors to International Telephone and Telegraph Corporation, Nutley, N.J., a corporation of Maryland Filed July 24, 1959, Ser. No. 829,291
15 Claims. (Cl. 340—174)

The present invention relates to magnetic storage systems embodying magnetostrictive and magnetic materials.

One of the fundamental requirements in the design of digital computers is the ability to store digital information signals. It is desirable in the majority of computer memory systems, to store information signals for unlimited periods, but also to have any of such stored signals readily accessible for use when recovery is desired.

Many such memory systems have been proposed, but those employing ferromagnetic materials as the storage element seem to lend themselves well to the requirements of the majority of the computers presently in use. Ferromagnetic materials can be readily energized by electrical signals to store information signals in the form of residual magnetism. This stored magnetic energy is easily detected and transformed back into electrical signals representative of the original stored information. In practical systems many problems in exploiting these properties have been encountered. Systems such as the magnetic drum memory must be mechanically driven at high speeds at all times during computer operation. This continuous operation condition poses various mechanical maintenance problems and also consumes large amounts of electrical power. The popular magnetic core memory consumes no power while not in use even though the computer may be in operation. In this type of memory, however, each time the stored information is read out of the system it is destroyed and cannot be used again unless it is replaced by complicated external circuitry.

In accordance with this invention, a relatively simple arrangement for storing electrical signals is provided which involves the use of the magnetostrictive properties of an electromechanical element. This property of magnetic materials is well known in the art and is characterized by a physical change in dimension in response to a variation of magnetic flux density impressed on such a material. When a magnetic field is impressed on a member exhibiting a sufficient amount of magnetostriction, mechanical stresses are produced within the body tending to distort it. Inversely, when such a body is distorted there is an accompanying change in its magnetic permeability. If, for example, a given portion of a bar of magnetostrictive material is suddenly exposed to a localized magnetic field two localized mechanical pulses will be propagated along the bar in both directions from the impressed field. These mechanical pulses are characterized by an accompanying variation in the magnetic permeability of the material in the same region as the mechanical pulses.

The present invention makes use of this phenomenon accompanying magnetostriction to produce an improved magnetic recording system. If the aforemention mechanical pulses are produced in a magnetostrictive element of suitable material they will cause the formation of low permeability regions which will be propagated with the mechanical pulse. It has been discovered by this invention that these regions are of sufficient difference in permeability from the surrounding material to be used as access gates to a magnetic material disposed in coactive relation to the bar.

To produce a practical system a bar or ribbon of magnetostrictive material is suspended or supported between suitable damping means so that reflection of impressed mechanical pulses will not occur as they reach the extremities of the material. Means to produce the proper mechanical pulses are then positioned in a desired location along the bar and in close proximity to the material. Although the embodiment herein illustrated shows the use of an electromagnetic transducer to produce this mechanical pulse, it is to be understood that other means such as a piezoelectric transducer could also be used as is well known in art. These mechanical pulses, as related to the above discussion, are characterized by an accompanying high reluctance region propagated through the element at a speed near the sonic rate. This high reluctance region is produced in accordance with the relation that the reluctance of a magnetic material is inversely proportional to the product of the permeability and the cross-sectional area of the element and directly proportional to the length of the element. In the present case the length and cross-sectional area are essentially constant, thus a decrease in permeability of the element provides an accompanying increase in reluctance. A material capable of being magnetized to store magnetic energy is disposed in coactive relation to the magnetostrictive material and an electromagnetic transducer is disposed in juxtaposition to the magnetostrictive material to provide a low reluctance magnetic circuit through the magnetostrictive element. It is thus possible to impress a magnetic flux into the element by energizing the electromagnetic transducer. If the aforementioned low permeability region is in the vicinity of the magnetic material when the magnetic flux is impressed into the magnetostrictive element some of the flux present in the element will be diverted around this region in accordance with the principle that magnetic flux will assume the path of least reluctance. This flux will magnetize a portion of the magnetic material and thus be stored as magnetic energy. Conversely, any regions of the magnetic material which have been magnetized by this method will apply magnetic flux to the magnetostrictive element and therefore to the electromagnetic transducer. Thus, it is possible to detect these regions by merely propagating another low permeability region through the magnetostrictive element and utilizing the electrical signal output from the transducer caused by the change in flux produced as the variable permeability region passes through the flux linkages between the magnetic material and the magnetostrictive material-transducer circuit. In this manner non-destructive magnetic recording is successfully accomplished without the use of intricate mechanical mechanisms or complicated circuitry or power consuming apparatus.

It is therefore an object of the present invention to provide an improved magnetic storage device utilizing no moving parts, capable of being completely controlled and activated by electrical signals, and whose recorded signal may be non-destructively sensed.

Still another object is to provide a recording device which consumes no power during periods in which signals are not being transferred into or out of the device.

A further object is to provide a signal storing system utilizing a plurality of magnetic storing devices whereby they are activatable by one or more electrical signals and sensed individually or in groups.

A feature of the present invention is the use of magnetostrictive properties to provide an access gate to a magnetic storage element.

The novel features that are considered characteristic of this invention are set with particularity in the appended claims. The invention itself, however, both as to its organization and method of operation, as well as additional objects and advantages thereof, will be best understood from the following description when read in conjunction with the accompanying drawings, in which:

Figure 1:
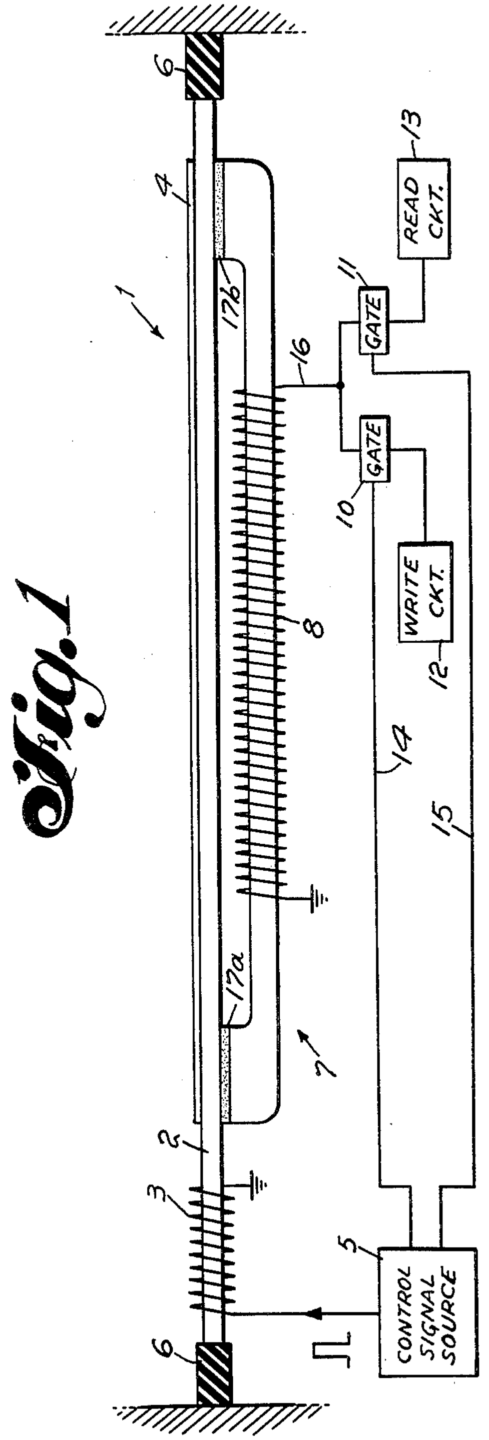
FIG. 1 is a view in perspective of one form of magnetic storage device in accordance with the principle of this invention.

FIG. 1 shows an electromechanical element 2 adapted for use in the system 1 of the present invention. This element is of a material which exhibits an appreciable amount of magnetostriction when activated by some external means. The element provided for use in the present system is of the type which is capable of being activated by a localized longitudinal magnetic field to have a mechanical pulse propagated along the element at a speed near the sonic rate. This pulse is accompanied by a discrete zone of variable permeability which may be of either higher or lower permeability from the surrounding material. The particular element 2 illustrated in FIG. 1 is chosen of a material such as annealed nickel which exhibits a traveling region of low permeability upon activation by a localized magnetic field applied by element activating means 3. Activating means 3 is essentially a coil of wire disposed coactive of element 2 and designed to impart a local magnetic field to element 2 which is closely controlled in length. Overlying element 2 and magnetically coupled thereto is a magnetic storage means 4, capable of storing energy in the form of residual magnetism. Means 4 can be of a variety of materials, such as the magnetic oxides of iron which will retain magnetic energy as residual magnetism after being magnetized by some external magnetic field. Control signal source 5 coupled to activating means 3 is adapted to supply an operating potential to activation means 3. This control source is also capable of supplying various other control signals, in varied programs, to control the system 1 in preselected modes of operation. Support means 6 are of a suitable material, such as rubber, to provide non-reflecting terminations for electromechanical element 2. These supports are designed to attenuate any mechanical pulse reaching the ends of element 2 and to insure that these pulses will not be reflected back into the element. Magnetically coupled to electromechanical element is magnetic circuit means 7 provided to complete a low reluctance magnetic circuit through a portion of element 2 and to magnetically couple this circuit to transducing means 8 disposed in coactive relation to a portion of circuit means 7. Means 7 can be composed of any ferromagnetic material which exhibits a relatively low reluctance path to impressed magnetic fields. Coupled to transducer 8 through gating circuits 10 and 11 are write circuits 12 and read circuits 13 which supply information signals to be stored and utilize any signals which may be read out of the storage device. Gating circuits 10 and 11 are provided to couple the proper circuit to transducing means 8 in response to control signals emitted from control signal source 5 coupled through lines 14 and 15 to these circuits. This coupling is provided in proper time relation to a predetermined synchronism between the activation of element 2 and also a preprogramed selection of the particular function desired to be performed by system 1.

Figure 2:
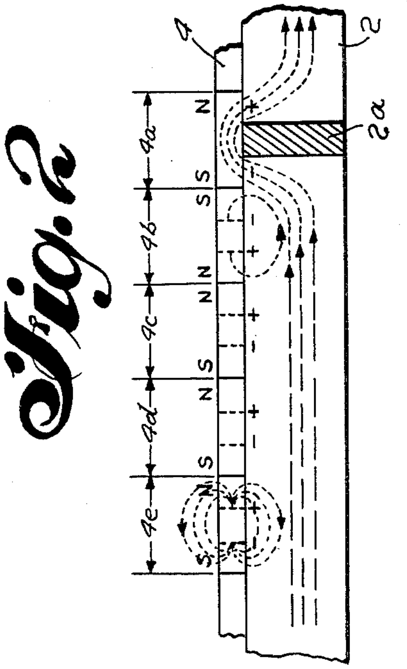
FIG. 2 is a diagram of a plane view of a section of the element useful in explaining the operation of the device.

In order to facilitate the illustration the operation of the system of FIG. 1, the additional FIG. 2 is provided showing in enlarged view a portion of the element 2 and the magnetic storage means 4. Zone 2*a* of element 2 is a sectional representation of the low permeability region propagating along element 2 during activation of the element. Regions 4*a* to 4*e* are representations of magnetized regions, representative of signal information stored in the magnetic storage means 4.

Referring to FIGS. 1 and 2, the operation of the system illustrated in these figures is as follows: When an electrical pulse is supplied to activation in coil 3 from the control signal source 5 a momentary magnetic field is developed which causes element 2 to change in length in the region of the activating coil 3. This change in length sets up two mechanical pulses characterized by accompanying low permeability zones which are propagated through element 2 in both directions, i.e., one towards each end of element 2. By providing the suitable support means 6, it is insured that only one pulse will travel the length of element 2 and pass along magnetic storage means 4. Once the element 2 has been activated it is possible to either "write" information signals into storage means 4 or to "read" information signals which may be stored therein. This selection is made by energizing either gates 10 or 11 to couple the proper circuit to transducing means 8. To write signals into the storage means 4 the gate 10 is activated by a signal from source 5 after the low permeability zone 2*a* has entered the loop formed by element 2 and magnetic circuit means 7. The signals to be stored are then allowed to enter transducing means 8 by passing gate 10 and into the transducer along line 16. The signal information must follow the aforementioned activation pulse by a certain time delay so that it will be transferred to transducer 8 after the activation pulse has reached a desired point in element 2 so that the information signals will be transmitted to circuit means 7 only when element 2 is properly activated. This is accomplished by having the write circuits operate during activation of gate 10.

It is to be understood, however, that other means for synchronizing the activation of element 2 and the signal information could be used, as is well known in the computer art.

Upon entering electromagnetic transducer 8, the write signals energize this transducer and produce magnetic fields which are transferred to circuit means 7. Circuit means 7, in essence a specialized electromagnet, is thus provided with magnetic flux which is representative of the electrical signals used to energize the transducer 8. Magnetic flux, thus established in circuit means 7, will also flow into element 2 across gaps 17*a* and 17*b* and establish a magnetic field parallel to storage means 4 in element 2. The gaps 17*a* and 17*b* are provided with some suitable packing such as steel wool to insure a proper low reluctance magnetic coupling between circuit means 7 and element 2. This packing, however, must not present an appreciable interference to the mechanical pulse propagating through element 2.

The magnetic flux thus established in element 2 will travel in either of two directions along this element depending upon the polarity of the signal impressed into transducer 8. However, upon reaching the low permeability zone 2*a* which has been established in element 2, these flux lines are diverted around zone 2*a* and will pass through a portion of the magnetic material 4, as shown in FIG. 2. This low permeability region 2*a* presents a high reluctance path to magnetic flux in comparison to the surrounding material of element 2 as discussed hereinabove, which causes the magnetic field to seek the less reluctant region of the magnetic material. The magnetic material is higher in reluctance than the regions of the magnetostrictive element not having a mechanical pulse present in them, yet lower in reluctance than an air path. Thus, it will not be appreciably affected by magnetic fields present in element 2 until a high reluctance region is present in element 2. Upon passing through magnetic material 4, the magnetic flux will establish a magnetized region therein representative in magnitude and polarity of the field used to establish it. This magnetized region will be retained in storage means 4 as residual magnetization and will link element 2 with discrete magnetic fields after the high reluctance region 2a passes, as shown in FIG. 2 by portions *4b* to *4e* of magnetic material 4. By varying the direction of the current in transducer 8 the flux impressed into element 2 will also vary in direction and the polarity of the magnetized regions *4b* to *4e* will be set up in the direction in accordance with the field which causes it.

In the present system it is only desirable to record signals on the magnetic material 4 along the portion defined by the inner length of the space between gaps 17a and 17b. Therefore, it is obvious that information will only be fed into the device through gate 10 during the time when the activating mechanical pulse is within this defined region of element 2. However, it should be recognized that it is possible to place signals to be stored along any portion of magnetic material 4 and between any two chosen points within this defined region. This is accomplished by energizing gate 10 at the proper time interval after the activation of element 2 to allow the mechanical pulse to propagate to the first chosen point and to close this gate when the pulse has been propagated to the second chosen point. The propagation of the mechanical pulse in a chosen medium is essentially constant at a constant temperature. Thus, it is possible to accurately relate distance of propagation of a mechanical pulse, in such a medium, to the time elapsed after activation.

To read out information signals stored in storage means 4 it is merely necessary to activate electromagnetic transducer 3 by a signal supplied from signal source 5 and thus initiate another mechanical pulse propagating along element 2. When this pulse reaches the desired region of reading; gate 11 is opened by a control signal from source 5 and read circuits 13 are coupled to transducer 8 through line 16. As the low permeability zone 2a enters one of the magnetized regions such as those illustrated in FIG. 2, it will interrupt the flux linkage between the poles established at the ends of each of these regions and the field will be diverted into element 2 to both sides of region 2a in a path much like the one shown to illustrate the establishment of these magnetized regions in FIG. 2. This sudden increase in magnetic flux in element 2 will in turn be transferred into circuit means 7 to complete a magnetic circuit through circuit means 7 and the magnetized portion of storage means 4. As the magnetic flux thus impressed into circuit means 7 travels through transducer 8 an electrical signal representative of the magnetized region causing it will be established in transducer 8 and transferred to read circuits 13 which have been coupled to transducers 8 through gate 11. Since the information read out of the magnetic storage means 4 is distributed along element 2 in a serial arrangement it is possible to select any portion of the information for reading by activating gate 10 at the time corresponding with the passage of mechanical pulse 2a along the magnetized portion containing the desired information and to close gate 10 when the desired selection is completed. In this manner one can appropriately select any part of the information stored in storage means 4 by properly selecting the time of energization of gate 10 with respect to the time of activation of element 2.

Figure 3:
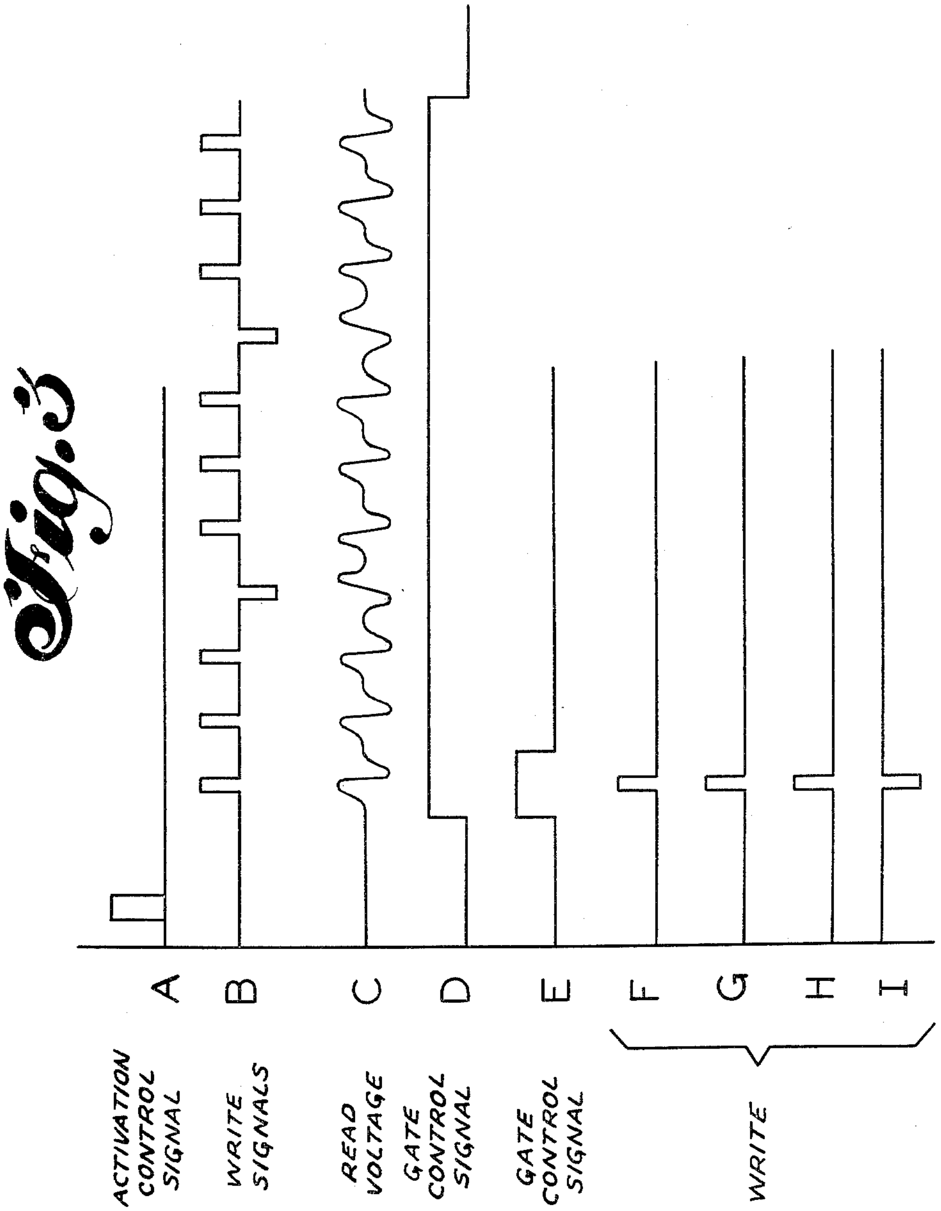
FIG. 3 is a graphic representation of various waveform sequences useful in explaining the diagrams shown in FIGS. 1 and 2.

To facilitate comprehensive understanding of the system illustrated in FIGS. 1 and 2, reference is now had to these figures in conjunction with the waveform shown in FIG. 3. The activation of element 2 is instituted by the activation signal shown at A being supplied to activating coil 3. The mechanical pulse thus produced will be propagated along element 2 and adjacent to magnetic material 4. After element 2 has been activated and the low permeability region 2a is within the closed loop formed by element 2 and circuit means 7, the gate control signal D is transferred along line 14 to transducer 8 and to institute the emission of signals from write circuits 12 to be stored in magnetic material 4. These information signals, illustrated at B, are shown as conventional binary bits of the return-to-zero type; a positive pulse representing a 1, and a negative pulse a 0. It is to be understood that the information signals need not necessarily be of this character but are merely represented in this manner as a method of illustration. As these signals reach transducer 8 magnetic fields will be set up in the transducer which will be dependent upon the polarity of the signal used to energize the transducer. Thus, a signal representing a 1 might produce a magnetized region in storage means 4 which would have its north pole toward the right while a zero would produce a region magnetized to have its north pole toward the left. This configuration is shown in FIG. 2; the regions *4a*, *4c*, *4d*, *4e* representing ones, and region *4b* representing a zero. At the time when it is desirable to stop recording information, the gate 10 is closed by allowing the gate control voltage to return to zero potential and de-couple write circuits 12 from transducer 8. For example, if it were desired to store only the first bit of the chain of signals shown at B, the gate signal shown at E could be energized to allow transfer of energy into transducer 8 for only one bit time. Thus, only the first signal would pass into transducer 8 and be stored in the magnetic material 4. By utilizing this method and adjusting the energization of gate 10 to the proper relation with the distance of travel of low permeability zone 2a it is possible to place single bits of information anywhere along element 2 and to substitute new bits in place of ones which might have previously been established. To erase or destroy the information stored in magnetic material 4 a chain of zeros would simply be written in place of the existing information or energize the full length of the magnetic material 4 with a constant unidirectional bias.

The reading of the stored signals can be controlled by the same signals which were used to control the writing process by supplying the gate signal to gate 11 rather than gate 10 and allowing the activation signal A to activate element 2. The mechanical pulse instituted in element 2 will thus travel along adjacent the magnetic storage means 4 and produce a varying magnetic field in circuit element 7 as described hereinabove. This field will cause transducer coil 8 to be energized and produce the electrical output waveform shown at C. This waveform signal is seen to have a configuration which is representative of the reversals in the magnetizing current; write current going in the more positive direction yielding an increase in potential of the read signal and a write current going in the more negative direction yielding a decrease in the read potential. These signals are transferred from the transducer 8 to the read circuits 13, through the coupling effected by line 16 and gate 11. They can then be transformed into signals which are the duplicate of the written waveform B by read circuits 13 as is well known in the computer art.

Figure 4:
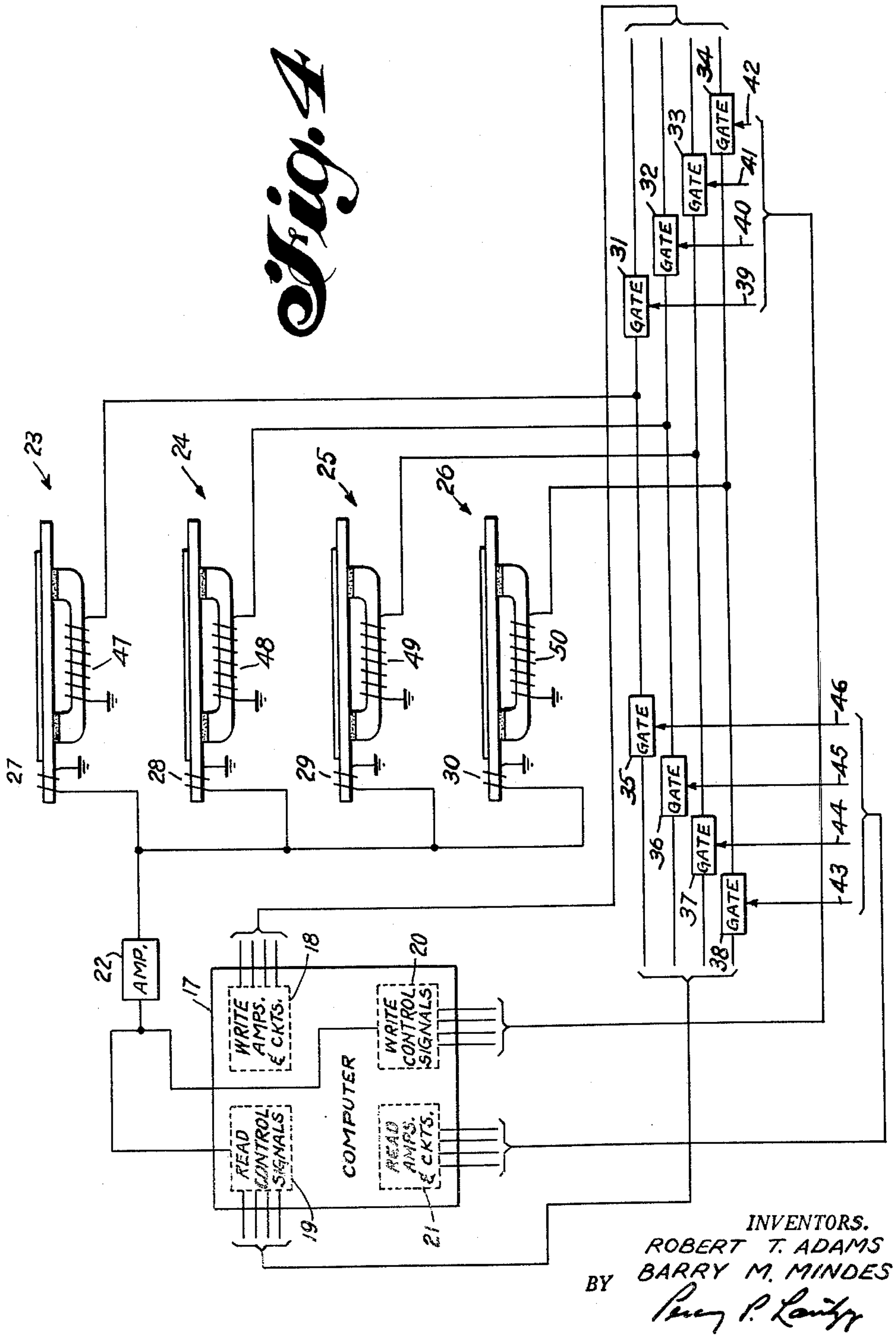
FIG. 4 is a simple storage system according to the invention.

The system illustrated in FIG. 4 is a typical memory or storage system for use in a computer comprising a plurality of the storage devices described hereinabove arranged to perform various basic storage functions. The operation of this system is similar to the operation of the system of FIG. 1 and will also be explained in conjunction with the waveforms shown in FIG. 3. The computer 17 having write control circuits 18, read control circuits 19, write circuits 20 and read circuits 21 is supplied to provide the various control signals for the control of the storage system and to provide and utilize various information signals pertinent to the operation of the computer 17. Write control circuits 19 and read control 20 are coupled to amplifier 22 used to amplify and properly shape the control signal used to activate the storage devices 23 through 26 by supplying an activation pulse to transducers 27 through 30 simultaneously through the parallel input arrangement shown. Write circuits 18 are coupled to input gates 31, 32, 33 and 34 to supply information signals to be stored. Read circuits are coupled to gates 35, 36, 37 and 38 to control the coupling of output information to computer 17. Both read control circuits 19 and write control circuits 20 are coupled to their respective control gates through the plural circuit arrangement shown.

The operation of the storage devices 23 through 26 for storage of information therein and the reading out of the stored information is analogous to that described in conjunction with FIGS. 1 and 2. The use of a plural system, however, provides several advantages not capable of being shown in conjunction with a single device. Activation of the devices is brought about by supplying an electrical pulse to the activation coils 27, 28, 29 and 30 simultaneously. Information signals can thus be stored in all of the devices, if it is desirous to do so, by passing information signals simultaneously from the write circuits 17 and energizing gates 31 through 34 during the same time interval. Thus, various groups of information signals can be stored in individual devices during the same time interval. If it is desired to store information signals on only one device, however, the control signal D of FIG. 3 need only be supplied to one input gate. For example, if information were to be stored in device 23 the activation pulse A in FIG. 3 would be used to energize all of the storage devices. The information to be stored would be emitted from the computed write circuits on the proper line to be coupled to this device through input gate 31. The gate control signal would be fed into gate 31 via line 39 to allow the information to enter the transducer 47 of device 23 and be stored in this device.

To read the information stored in any one of the storage devices an activation pulse is emitted from the read control circuits and once again all of the devices 23 through 26 are activated. If the information desired is contained in device 23 the gate control signal is transmitted along line 46 to this output gate to couple the transducer 47 of this device to read circuits 21. However, if it were desired to read the information stored in all of the devices simultaneously it is merely necessary to pass the gate control signal D of FIG. 3 along all of the lines 43 through 46 to energize all of the output gates simultaneously and thus couple all of the transducers 47 to 50 to the read circuits 21.

An additional advantage of the present system can now be seen. In many computers it is now common practice to store and read stored information in a parallel mode i.e. information is processed in a parallel array rather than a serial one. For example, rather than transmitting the first four bits of information illustrated at B of FIG. 3 along a single wire, it is transmitted along four parallel wires which each transfer one bit of the information. This arrangement is shown in waveforms F to I of FIG. 3. In this manner, an appreciable time saving can be appreciated since it takes only one bit time to transfer the four bits of information which previously took four bit times. With many systems, this parallel transfer method is not feasible since it greatly increases the complexity of the system in switching operations and synchronism control. The present system, however, lends itself well to this type of operation.

To store the four bits shown in F through I of FIG. 3 in the system of FIG. 4, the storage devices are activated by activation signal A and when the activation pulse has reached the proper position, as discussed above, the four signals are fed in parallel to input gates 31 through 34. These gates energized by gate control signal E allow the four signals to enter the individual transducers 23, 24, 25 and 26. Thus one signal is stored in each of one of the four storage devices. These signals can also be recovered in parallel by activating the devices by an activation signal A from read control source 19 and opening output gates 35, 36, 37 and 38 with control signal E transmitted in parallel to these gates on lines 43 to 46. As can be easily seen, one may store as many parallel groups of information in these devices as the number of bits which can be stored linearly in one device. Any one group could be stored or read out of the storage system by energizing the input or output gates at the proper time after the activation of the device corresponding to the distance from the transducers 27, 28, 29 and 30 at which the bits of information were to be stored or had been stored.

While we have described above the principles of our invention in connection with specific apparatus, it is to be clearly understood that this description is made only by way of example and not as a limitation to the scope of our invention as set forth in the objects and features thereof and the accompanying claims.

We claim:

1. A signal storing system, comprising a device having a given series of storage positions associated therewith, coupling means associated with said device to transfer electrical signals relative to said storage positions, a source of control signals capable of activating said device to propagate traveling signals therein, and means synchronized with the time position of said traveling signals to activate said coupling means to transfer an electrical signal relative ot said device when said traveling signal is at a selected one of said storage positions.

2. Signal storing system according to claim 1 wherein said device includes: an element capable of propagating a zone of variable permeability therealong and having the said series of positions associated therewith, a magnetic storage medium disposed in coactive relation to said element along said series of associated storage positions, and means including at least a portion of said element to complete a magnetic circuit, said magnetic storage medium being capable of having a portion thereof magnetized and thereby apply magnetic flux to said element in inclusion in said magnetic circuit.

3. A signal storing system according to claim 2 wherein said device includes an electromagnetic transducer coupled to said magnetic circuit and adapted to apply magnetic energy representative of a signal to be stored in said device to said magnetic circuit in synchronism with said control signal to selectively magnetize selected portions of said medium.

4. Signal storing system according to claim 1 wherein said device comprises an element capable of propagating a zone of variable permeability therealong, means including at least a portion of said element to complete a magnetic circuit, transducing means coupled to said magnetic circuit and said coupling means for the transfer of electrical and magnetic energy between said magnetic circuit and said coupling means, and magnetic storage means adjacent said element, portions of said storage means being sequentially coupled to said coupling means through said element and said associated magnetic circuit in conjunction with magnetic flux displacements accompanying said propagating zone.

5. A signal storing system comprising an element for propagating a zone of variable permeability therealong, a magnetic storage medium adjacent to and extending along said element and thereby magnetically coupled thereto, means providing a magnetic circuit which includes at least a portion of said element, said zone of variable permeability displacing any magnetic flux which may be present in said circuit as it propagates through said element by varying the impedance of said magnetic circuit in the vicinity of said propagating zone to include an adjacent portion of said magnetic storage medium within said circuit.

6. A signal storing system comprising an electromechanical element, means for propagating a mechanical pulse providing a zone of variable permeability traveling along said element, a magnetic storage medium disposed in coactive relation to said element and adapted to be magnetically coupled thereto, and means including an electromagnetic transducer to provide a magnetic circuit which includes at least a portion of said element, said variable permeability zone altering said magnetic circuit to include a portion of said storage medium adjacent said element.

7. A signal storing system comprising an elongated magnetostrictive element, means for propagating a mechanical pulse providing a region of low permeability traveling along said element, a magnetic storage medium disposed in coactive relation to at least a portion of said element and magnetically coupled thereto, and means including an electromagnetic transducer to provide a magnetic circuit which includes at least a portion of said element, said low permeability region altering said magnetic circuit to include a portion of said storage medium adjacent said element.

8. A system according to claim 7 wherein said means for propagating a mechanical pulse comprises a second electromagnetic transducer disposed in coactive relation to a portion of said element.

9. A system according to claim 7 wherein said means including an electromagnetic transducer to provide a magnetic circuit comprises a core of magnetically soft material and a coil of wire wound about a portion of said core.

10. A signal storing system comprising a plurality of signal storing devices capable of being activated to store signals therein and to give out signals stored therein, a plurality of circuits corresponding to said plurality of storing devices to transfer electrical signals to said devices, a source of control signals capable of activating said devices to propagate traveling signals therein, and means synchronized with said traveling signals to activate said circuits to transfer signals to be stored in said corresponding devices, and further wherein each of said devices includes an element capable of being activated to propagate a traveling region of variable permeability therethrough, magnetic storage means disposed in coactive relation to each of said elements and means including at least a portion of said elements to complete a magnetic circuit for each of said elements, said magnetic storage medium being capable of having portions thereof magnetized and thereby apply magnetic flux to said elements for inclusion in said magnetic circuit.

11. A signal storing system according to claim 10 wherein said magnetic circuit includes an electromagnetic transducer adapted to couple electromagnetic energy relative said magnetic circuit.

12. A signal storing system comprising a plurality of signal storing devices capable of being activated to store a signal therein and to give out signals that may be stored therein, each of said devices comprising an electromechanical element having a magnetic storage means in an overlying relation thereto, a plurality of electromagnetic transducers corresponding to said plurality of storing devices, each said transducer being coupled to said corresponding device through a magnetic circuit which includes at least a portion of said electromechanical element, a plurality of electrical circuits, one associated with each of said devices, means to activate each of said elements, and means synchronized with said means to activate to couple said electrical circuits to corresponding ones of said transducers to effect signal transfer to said devices during the period said devices are activated.

13. A signal storing system for digital recording apparatus having a computer adapted to provide and utilize various information and control signals, comprising a plurality of devices capable of being activated by certain ones of said control signals to store information signals therein and to read out information signals that may be stored therein, a plurality of circuits associated with said devices to transfer information signals from said computer to said devices, and means for controlling the coupling of said circuits to corresponding ones of said devices in response to said certain ones of said control signals in accordance with a predetermined time relationship between said certain control signals and said information signals.

14. Signal storage apparatus comprising an element for propagating signals accompanied by zones of variable magnetic reluctance therealong, a magnetic member connected in a magnetic circuit with a portion of said element, a magnetic storage medium of greater magnetic reluctance than said element extending along said portion of said element adjacent thereto, means for applying propagating signals to said element, and an inductive element coupled to said magnetic member for transferring signals to said storage medium in conjunction with said propagating signals.

15. Apparatus according to claim 14, wherein said magnetic circuit includes means connected between said magnetic member and said portion of said element for completing said magnetic circuit with minimum attenuation of said propagating signals.

References Cited in the file of this patent

UNITED STATES PATENTS

| | | |
|---|---|---|
| 2,612,603 | Nicholson | Sept. 30, 1952 |
| 2,790,160 | Millership | Apr. 23, 1957 |